United States Patent [19]

Maruyama

[11] Patent Number: 5,115,549
[45] Date of Patent: May 26, 1992

[54] DIAGONAL INSERTION APPARATUS
[75] Inventor: Takayuki Maruyama, Suwa, Japan
[73] Assignee: Seiko Epson Corporation, Japan
[21] Appl. No.: 520,514
[22] Filed: May 8, 1990
[30] Foreign Application Priority Data May 8, 1989 [JP] Japan ................. 1-114619

[51] Int. Cl.$^5$ .......................... B23Q 1/06
[52] U.S. Cl. .................. 29/281.1; 269/56; 269/309
[58] Field of Search ........... 408/89, 90; 409/168, 409/224; 269/309, 310, 71, 296, 56; 198/345; 29/464, 559, 563, 33 P

[56] References Cited
U.S. PATENT DOCUMENTS

| | | | |
|---|---|---|---|
| 2,075,008 | 3/1937 | Damm et al. | 409/168 |
| 2,991,668 | 7/1961 | Keller | 408/89 |
| 4,390,172 | 6/1983 | Gotman | 269/309 |
| 4,586,702 | 5/1986 | Chambers | 269/310 |
| 4,856,943 | 8/1989 | Nelson et al. | 408/89 |

FOREIGN PATENT DOCUMENTS 216727  8/1989  Japan .

Primary Examiner—Robert C. Watson
Attorney, Agent, or Firm—W. Douglas Carothers, Jr.

[57] ABSTRACT

A diagonal insertion apparatus of this invention inserts a shaft-like member into an insertion receiving component provided with a diagonal hole inclined with respect to a ground or horizontal plane and comprises a holding table or pallet for holding the insertion receiving component, an inclined positioning jig having a plurality of pins of different lengths to engage recess receivers in the bottom of the holding table and elevate and incline the holding table at a predetermined angular relationship to permit properly aligned insertion of the shaft-like member into the insertion receiving component. The inclined positioning jig contains reference means for determining the arrangement of the multiple pins so that the axis of a diagonal hole in the insertion receiving component is aligned with axis of the shaft-like member to be inserted therein. The use of an inclined positioning jig having such reference means provides for easy switching to different models of insertion receiving components as well as provides for easy aligned insertion of shaft-like members into the diagonal holes of insertion receiving components.

4 Claims, 4 Drawing Sheets

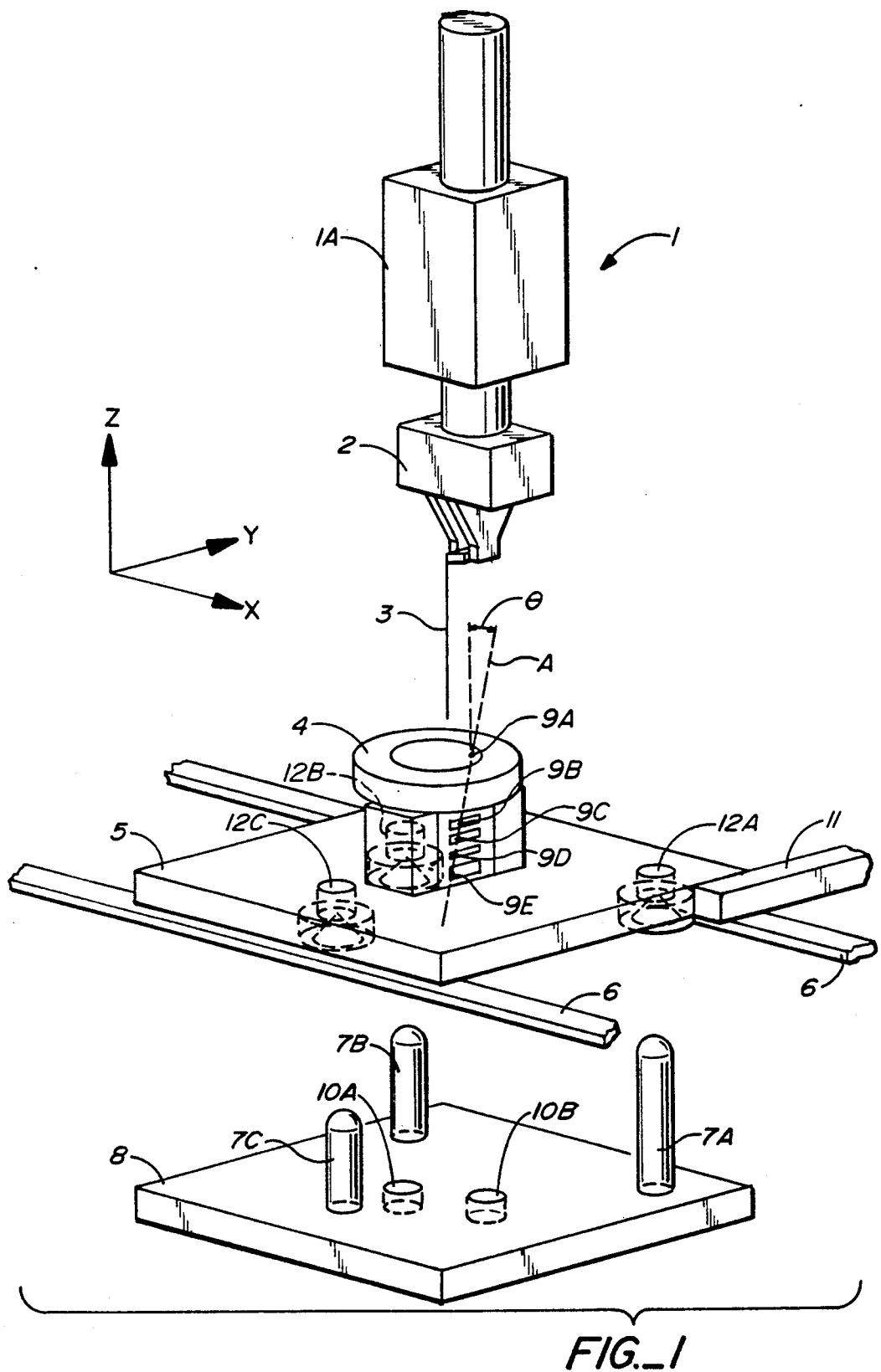
FIG._1

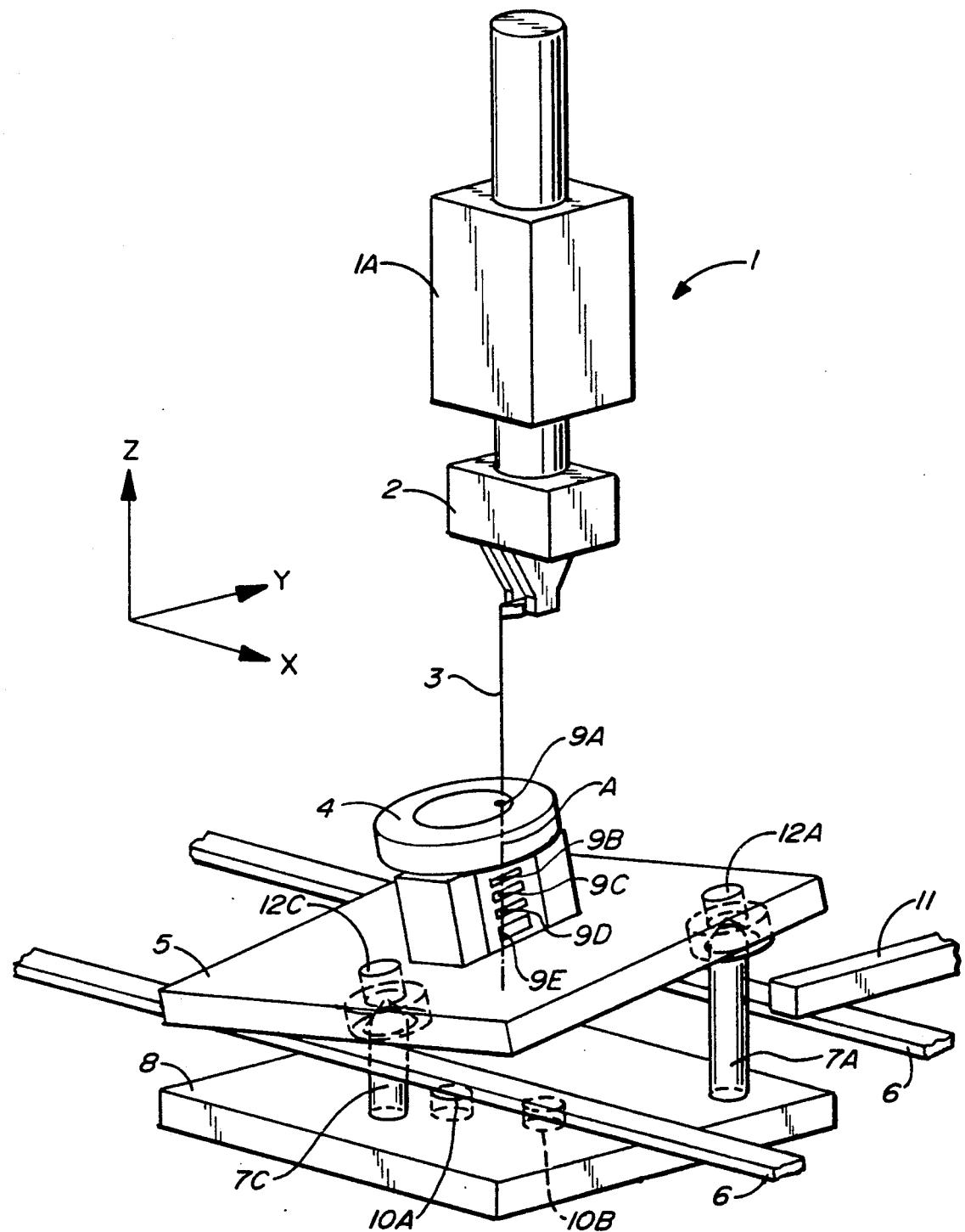
FIG._2

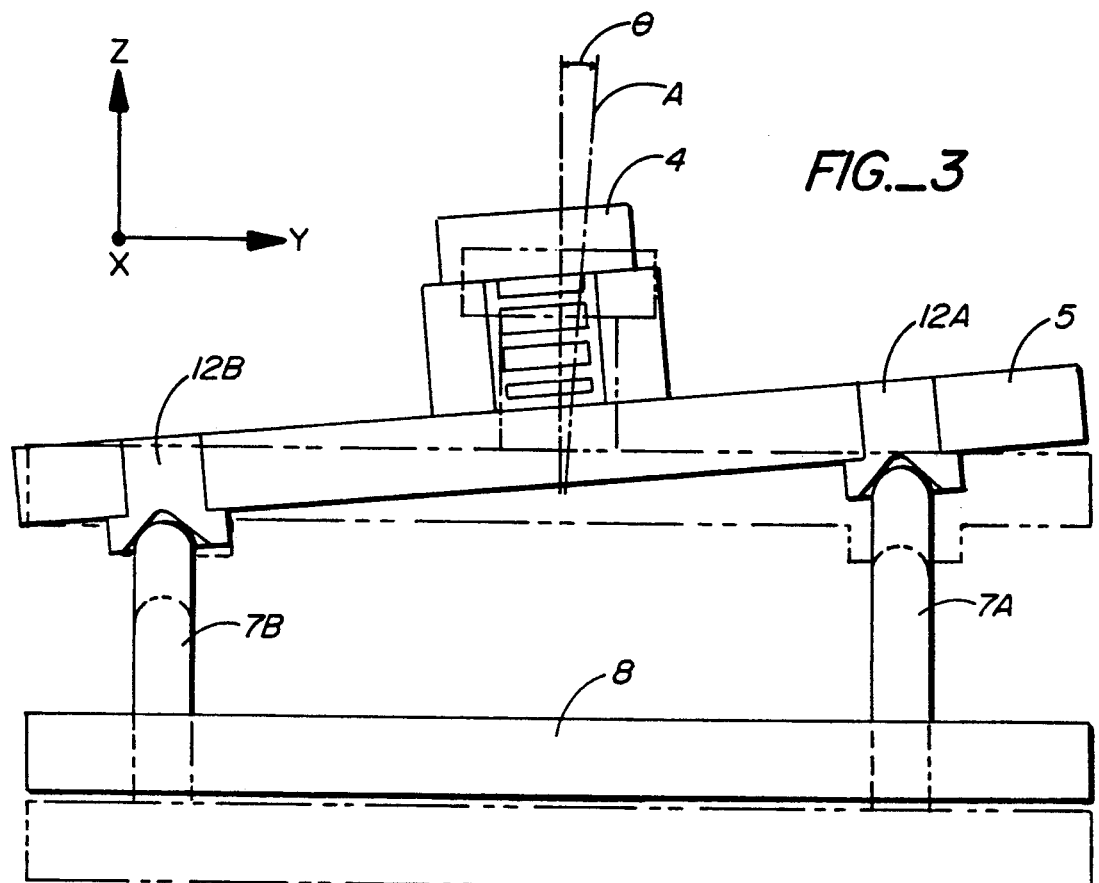
FIG._3
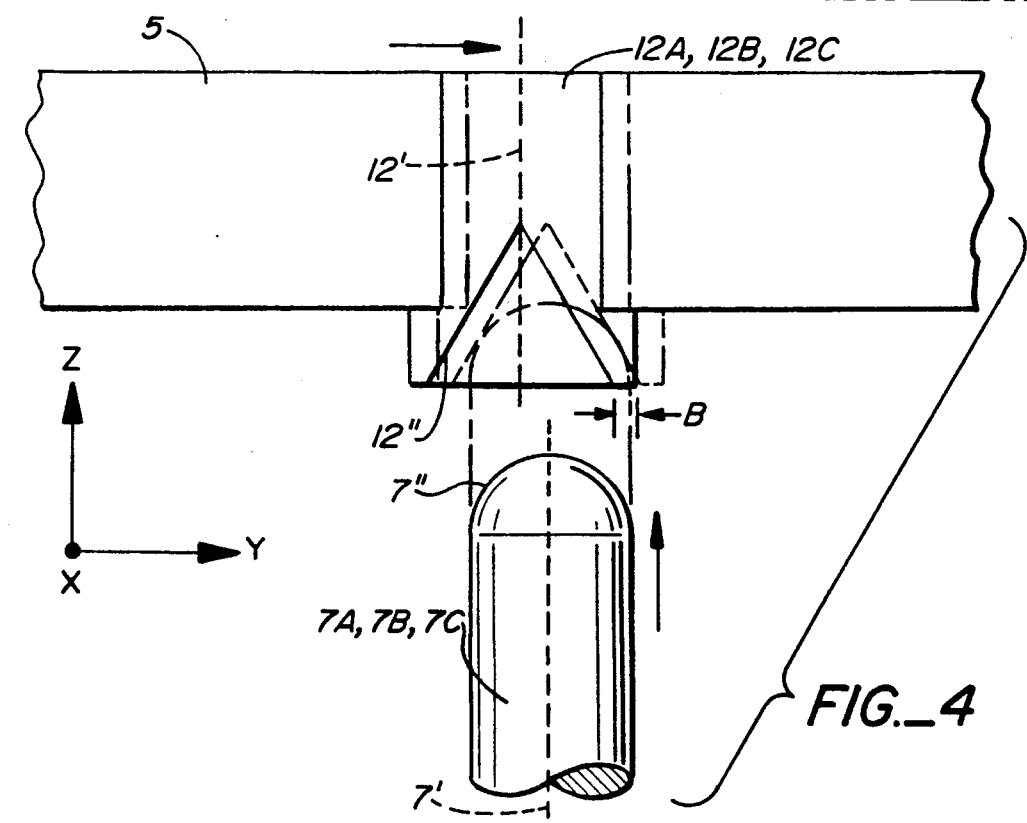
FIG._4

DIAGONAL INSERTION APPARATUS

BACKGROUND OF THE INVENTION

This invention relates generally to a structure of diagonal insertion apparatus used in the assembly of equipment and more particularly to diagonal insertion apparatus for the insertion of shaft-like members into holes of insertion receiving components in the process of assembling equipment.

In particular, this invention facilitates the easy alignment and insertion of shaft-like members into diagonal holes of components of equipment being assembled as accomplished with diagonal insertion apparatus used in the assembly process. The diagonal insertion apparatus of this invention has particular relevance in the assembly of equipment in the form of wire dot print heads. The equipment component in the process of being assembled is a print head wire guide and is supported on a holding table or pallet and has one or more diagonally aligned holes for receiving a shaft-like member, e.g., a dot print head dot wire, inserted therein by an actuator of the diagonal insertion apparatus. The holding table is aligned beneath the diagonal insertion apparatus and is elevated as well as inclined at an appropriate angle relative to a horizontal plane by a plurality of vertically extending pins having different lengths supported on a mounting plate which is aligned beneath the holding plate. Thus, the mounting plate is elevated from below the holding table to impose a predetermined tilting alignment to the holding table so that the center line of a diagonal hole is aligned with the axis of a shaft-like member held by the diagonal insertion apparatus for insertion into the diagonal hole.

Examples of such diagonal insertion apparatus of the prior art employed in the assembly of equipment are disclosed in FIGS. 5 and 6 wherein equipment component 16 is provided with a diagonal hole 16A inclined at an angle with respect to the horizontal plane and shaft-like member 15, held in a chuck 14 is inserted into hole 16A by means of actuator 13. As shown in FIG. 5, actuator 13 is inclined by means of an inclined support stand 17 or, as shown in FIG. 6, actuator 13 is inclined by means of an adjustable mechanism 17A to axially align shaft-like member 15 relative to hole 16A.

However, in connection with the first configuration shown in FIG. 5, the mechanism employed to perform insertion, i.e., actuator 13, was constructed to be at the desired inclined angle for proper alignment of member 15 for insertion into hole 16A but the performed inclined angle for actuator 13 is not easily achieved because of lack machining accuracy of inclined surfaces determining the precise angle of required inclination. Furthermore, in the case of the second configuration shown in FIG. 6, the inability to see the inside of the diagonal hole made precision axial aligning adjustment extremely difficult, even in the case where a fine adjustment mechanism for positioning mechanism 17A was included with the apparatus.

Further, from the aspect of continual supply of the shaft-like members 15 for insertion into holes 16A, when the receiving components must be moved horizontally or rotated relative to their axis, the mechanism employed to move these components for alignment in a direction relative to the X, Y, Z, and θ axes and incline them has little space for maneuverability resulting in the design of a complicated mechanism rendering continuous alignment accuracy difficult.

In addition, whenever the model or type of member 16 to receive inserted members 15 is changed and the angle of diagonal hole 16A is correspondingly changed, the angle of inclined stand 17 must also be readjusted or changed.

It is an object of the present invention to solve the foregoing described problems.

It is a further object of this invention to offer a diagonal insertion apparatus that provides for the easy insertion shaft-like members into diagonal holes of components in an assembly line type environment by providing for easy axial alignment of the component holes relative to the shaft-like members.

SUMMARY OF THE INVENTION

According to this invention, the diagonal insertion apparatus of this invention inserts a shaft-like member into an insertion receiving component provided with a diagonal hole inclined with respect to a ground or horizontal plane and comprises a holding table or pallet for holding the insertion receiving component, an inclined positioning jig having a plurality of pins of different lengths to engage recess receivers in the bottom of the holding table and elevate and incline the holding table at a predetermined angular relationship to permit properly aligned insertion of the shaft-like member into the insertion receiving component. The inclined positioning jig contains reference means for determining the arrangement of the multiple pins so that the axis of a diagonal hole in the insertion receiving component is aligned with axis of the shaft-like member to be inserted therein. The use of an inclined positioning jig having such reference means provides for easy switching to different models of insertion receiving components as well as provides for easy aligned insertion of shaft-like members into the diagonal holes of insertion receiving components.

In particular, the diagonal insertion apparatus provides means for inserting shaft-like members into insertion receiving components containing a plurality of diagonally aligned holes wherein an inclined positioning jig containing, for example, three pins of different heights or lengths is employed beneath a holding table or pallet supporting the insertion receiving component. The pin containing jig is elevated to, in turn, engage the bottom of the holding table via the ends of the three pins and elevate and incline the holding table so that axial alignment of the component hole relative to the shaft-like member is accurately achieved. Therefore, compared to diagonal insertion apparatus of the prior art which had to perform positioning in the four axial directions relative the X, Y, Z and θ axes, positioning of the component diagonal hole relative to axial alignment with the shaft-like member is simplified because angular relationships which are difficult to achieve, due to precise multidirectional adjustment, are replaced with the use of vertical pin lengths on the jig wherein the lengths of pins provide for easily and automatic aligned positioning of the hole containing component.

Thus, the diagonal insertion apparatus of this invention is capable of determining the positions of X, Y, Z and θ axes by simply changing the inclined positioning jig to correspond with a change in the particular model or type of insertion receiving component by utilizing reference means in the form of reference positions and setting the reference positions on the inclined positioning jig and determining relative positions of the multiple pins of different lengths from the reference positions. Thus, the inclined positioning jig contains reference positions for determining the proper spatial relation and arrangement of the multiple pins as well as its proper aligned relationship with the holding table or pallet supported thereabove so that the axis or center line of the component diagonal hole in which the shaft-like member is inserted and the axial line of the shaft-like member are precisely aligned. As a result, if the assembly of a first type of insertion receiving component is completed and assembly is switched to a second type of insertion receiving component, another inclined positioning jig having multiple pins with different vertical pin heights or lengths corresponding to the correct angular alignment relationship required for the second type insertion receiving component is substituted and positioned beneath the component holding table. In this manner, automatic alignment of the jig relative to the holding table is assured and is independent of changes in pin heights or changes in the positional relationship of the pins or their corresponding holding table recessed receivers, particularly as aligned relative to the reference means formed on or in the positioning jig. Therefore, switching of insertion receiving components for assembly of other equipment models, such as wire dot print heads having a different number of dot wires for insertion in component holes at an angle different from other wire dot print head models, can be accurately accomplished by simply changing the type of inclined positioning jig to be employed for providing proper holding table elevation and angular alignment.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is an isometric view of a diagonal insertion apparatus comprising this present invention illustrated in a standby condition prior to insertion of a shaft-like member into an insertion receiving component.

FIG. 2 is an isometric view of the diagonal insertion apparatus of FIG. 1 illustrating the completion of positioning of the elevation and angular alignment of the insertion receiving component for proper alignment and reception of a shaft-like member.

FIG. 3 is a cross section configuration showing the angular relationship between the inclined positioning jig and the component holding table of FIG. 2.

FIG. 4 is a detailed cross section showing the relationship of the jig pins provided with rounded ends and their corresponding pin cone shaped receivers to bring about a precise centering action of the holding table.

DESCRIPTION OF THE PREFERRED EMBODIMENTS

Figure 6:
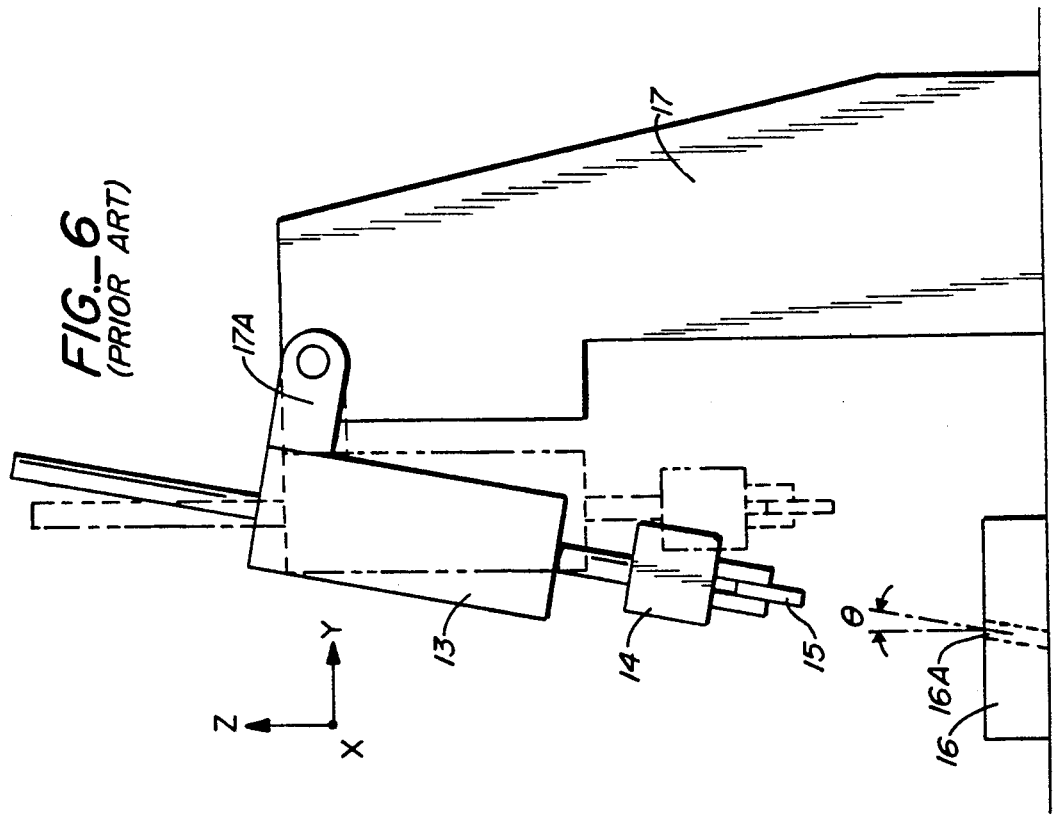
FIG. 6 is a side elevation view of another type of a diagonal insertion apparatus of the prior art.
Figure 5:
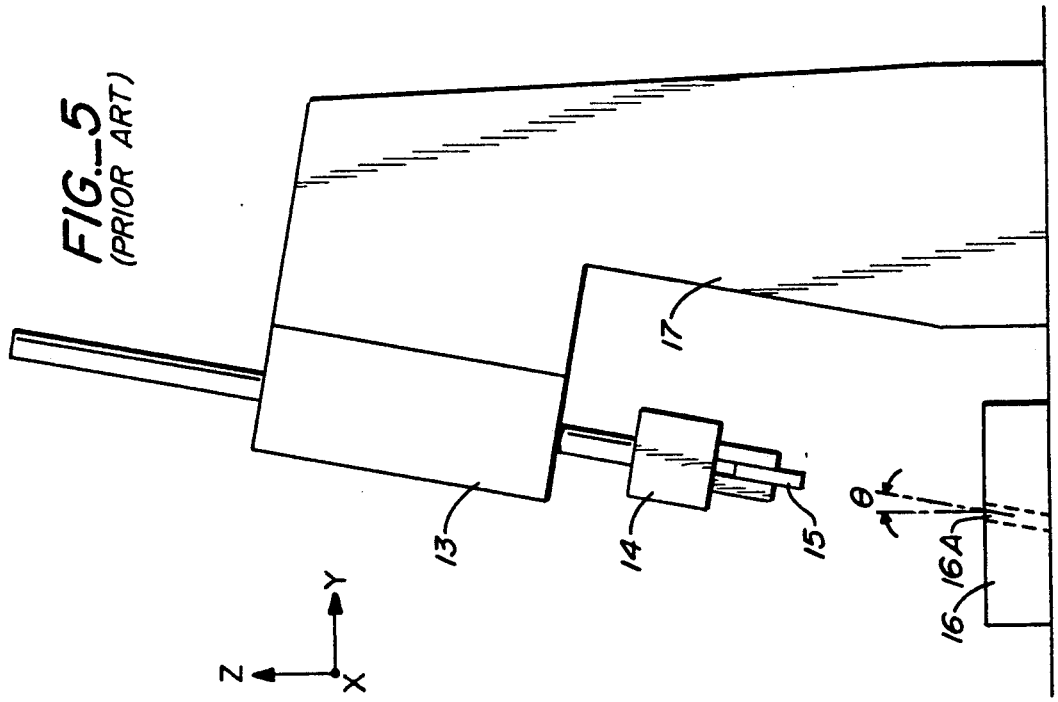
FIG. 5 is a side elevation view of one type of a diagonal insertion apparatus of the prior art.

A working example of the invention will now be explained relative to the assembly of equipment in the form of a wire dot print head for an impact dot matrix printer. Such heads include an insertion receiving component in the form of a wire guide having a plurality of angularly disposed and aligned holes through which shaft-like members in the form of dot wires must be first aligned relative thereto and then inserted therein during the head assembly process. For simplicity, only one such group of angularly aligned holes is illustrated for insertion of one such shaft-like member.

In this connection, reference is now made to FIG. 1 wherein there is shown diagonal insertion apparatus 1 of this invention comprising actuator 1A for performing the perpendicular insertion operation of wire or shaft-like member 3 held in chuck 2 of actuator 1A. A pallet or holding table 5 supports an insertion receiving component 4 comprising a wire dot print head wire guide. Wire guide 4 has a plurality of spatially aligned wire guide holes 9A, 9B, 9C, 9D and 9E which are aligned along axis A at an angle $\theta$ with respect to the flat surface or horizontal plane of pallet 5. Pallet 5 is moved along a pathway by means of a transport belt 6 and pallet 5 is aligned in a predetermined position beneath actuator 1A by means of bring stop member 11 which is introduced into the pathway of pallet 5. Pallet 5 includes a series of cone shaped receivers 12A, 12B and 12C on its bottom surface. Mounting plate 8 is position below and aligned with pallet 5 and comprises an inclined positioning jig on the surface of which is arranged pins 7A, 7B and 7C having different heights or lengths. Pins 7A-7C are arrange to be aligned with and engage cone shaped receivers 12A-12C in the bottom of pallet 5. Pins 7A-7C are also arranged in prescribed positions with respect to reference means in the form of reference holes 10A and 10B so that they will position wire guide center line A, which is the alignment axis for wire guide holes 9A, 9B, 9C, 9D and 9E in wire guide 4, perpendicular relative to the horizontal plane of pallet 5 as well as move pallet 5 in a predetermined position relative actuator 1A.

Thus, with respect to the arrangement illustrated in FIG. 1, chuck 2 supports wire 3 in a vertical or perpendicular standby position and pins 7A-7C on mounting plate 8 are at their lower standby position. In operation, wire guide 4 supported on pallet 5 is carried via transport belt 6 to the standby position of FIG. 1 wherein the forward motion of pallet 5 is terminated when pallet 5 engages pallet stopper 11 inserted into the pathway of pallet 5 on belt 6. Next, mounting plate 8 containing pins 7A-7C is elevated to the point wherein the ends of pins 7A-7C respectively engage corresponding cone shaped receivers 12A-12C and support pallet 5 above transport belt 6. When the rounded ends of pins 7A-7C enter cone shaped apertures of pin receivers 12 on the bottom of pallet 5, the apertures center on the rounded ends of pins 7A-7C in a manner exemplified in FIGS. 3 and 4 so that accurate positioning relative to the X, Y, Z and $\theta$ axis is automatically calculated in advance by the arrangement and height of pins 7A-7C and accurately achieved by the elevation of plate 8. This is explained as follows with particular reference to FIG. 4. Even when there is an aberration B between the center line 7' of pin 7 and the center line 12' of pin receiver 12, if aberration B is within the ambient of both rounded end 7" of pin 7 and cone shaped aperture 12" of pin receiver 12, upon engagement of pin 7 within receiver 12, pallet 5 will be automatically shifted laterally to become aligned with pin 7 when plate 8 is elevated causing rounded end 7" to slide into and center in cone shaped aperture 12". Thus, aberration B is effectively eliminated. Furthermore, the positional relationship of three pins 7A-7C together with their differences in height or length will cause pallet 5, along with wire guide 4, to angularly incline so that center line A of wire guide holes 9A-9E will become perpendicular and in vertical aligned relationship with wire 3 as best illustrated in FIG. 2.

At this time, since pins 7A-C are positioned with respect to reference holes 10A and 10B so that the center line A becomes positioned at a predetermined position, the center line A is likewise positioned at the prescribed X, Y, Z and $\theta$ axial positions, i.e. when the axis line of wire 3 and the center line of wire guide holes 9A-9E are brought into parallel relationship they will also be in axial alignment as illustrated in FIG. 2. Next, wire 3, held by chuck 2, is inserted in wire guide 4 along center line A of guide holes 9A-9E by downward movement of chuck 2 via actuator 1A. Chuck 2 then releases wire 3 and thereafter is elevated by acutator 1A. Then, mounting plate 8 descends to its lower standby position permittting the return of pallet 5 to rest upon transport belt 6. Pallet 5 is then transported to the next station by transport belt 6 upon withdraw of stop member 11 from the pathway of pallet 5.

Reference holes 10A and 10B provide a means for determining in each case, the positional relationship of each of pins 7A-7C relative to each other as well as referenced to holes 10A and 10B themselves. Thus, in providing a different jig to accommodate a different insertion receiving components having different angular axes A with respect to the horizontal or other reference plane, the positional relationshi of pins 7A-7C relative to reference holes 10A and 10B can be established as the same in each case so that only changes in the height of pins 7A-7C need be changed to invoke a change in the desired angular axis A. Further, if it is necessary to change the distal and positional relation of pins 7A-7C relative to holes 10A and 10B, this can be also accomplished since reference holes 10A and 10B remain aligned relative to the stop position for pallet 5 supported immediately above jig 8. In other words, by making reference holes 10A and 10B the key reference point for both the relative positional relationship of pins 7A-7C and corresponding receivers 12A-12C relative to each otehr as well as the distal and postional relationship of pins 7A-7C from holes 10A and 10B, changes in models or the type of insertion receiving component 4 can be easily accommodated without any additional adjustment and alignment by merely replacing jig 8 itself to accommodate the model change or pallet change as required. Since the elevation of jig 8 is accomplished relative to reference holes 10A and 10B, proper alignment of jig pins 7A-7C is already accomplished without need for additional adjustment. Such jig alignment may be accomplished, for example, by vertical guide rods inserted through holes 10A and 10B during its elevation, although other forms of mechanical alignment or the use of optical alignment are comtemplated in the practice of this invention. As a result, down time of the assembly line operation due to model changes is materially reduced.

Also, alignment based upon the dimensional size of jig 8 is eliminated since accuracy in this type of alignment approach is, at best, not very accurate compared to the case where all proper positional and alignment relationships are determined relative to holes 10A and 10B in jig 8. In this manner, proper positional and alignment relationships can be more accurately determined.

In summary, the alignment means of apparatus 1 is composed of the holding table or pallet 5 on which is supported wire guide 4 as well as mounting plate 8 having multiple pins 7A-7C of different lengths. The insertion means of apparatus 1 is composed of actuator 1A supporting wire chuck 2 for holding wire 3. By means of the diagonal insertion apparatus of this invention, positioning and alignment relative to the predetermined X, Y, Z and $\theta$ axial positions and insertion of wire 3 into wire guide holes 9A-9E are facilitated by arranging a plurality of pins 7A-7C of different lengths in predetermined positions with respect to reference holes 10A and 10B.

While the invention has been described in conjunction with several specific embodiments, it is evident to those skilled in the art that many further alternatives, modifications and variations will be apparent in light of the forgoing description. For example, the employment of two reference holes 10A and 10B is not critical. One such hole or several holes would also accomplish the goal of the invention. Further, the reference means need not be a hole 10 but could be, for example, one or more notches in or pegs on jig 8 and provide the same positional and alignment relationships required. Thus, the invention described herein is intended to embrace at such alternatives, modifications, applications and variations as fall within the spirit and scope of the appended claims.

What is claimed is:

1. A diagonal insertion apparatus for inserting a shaft-like member into an insertion receiving component having a plurality of diagonal holes each having different angular orientation with respect to a reference plane and comprising
   a pallet for supporting said insertion receiving member and movable along an assembly line,
   a plurality of positioning jigs provided for position and alignment gaging relative to each one of said insertion receiving component diagonal holes,
   said positioning jigs supported along and beneath said assembly line and in aligned relation with said pallet when positioned thereabove, said jigs each having a plurality of vertical pins supported from a surface thereof,
   at least some of said jig pins having pin ends with different heights,
   each of said jigs selectively elevated to releasably engage the bottom of said pallet when positioned thereabove via said pin ends and concurrently elevate and incline said pallet relative to said reference plane in a fixed relationship relative to said jig so that the center line of a selected one of said diagonal holes is positioned and aligned relative to the axis line of said shaft-like member for aligned insertion thereof,
   reference means formed in said positioning jig for accurately determining the positional relationship arrangement of said pins relative to each other and their distal relationship to said reference means,
   said reference means provided relative to each of said positioning jigs to insure standardized accuracy among said positioning jigs in the positioning and alignment of each of said diagonal holes relative to its respective shaft-like member.

2. The diagonal insertion apparatus according to claim 1 wherein said reference means comprises at least one hole in said positioning jig.

3. The diagonal insertion apparatus according to claim 1 wherein said reference means comprises at least two holes in said positioning jig.

4. The diagonal insertion apparatus according to claim 1 wherein said pin ends are rounded, a plurality of corresponding cone shaped receivers formed in the bottom surface of said pallet for receiving said rounded ends and automatically centering said pallet relative to the spatial relation of said pins on said positioning jig.

* * * * *